(12) United States Patent
Ito

(10) Patent No.: US 7,064,840 B2
(45) Date of Patent: Jun. 20, 2006

(54) OPTICAL SAMPLING SYSTEM FOR SIMULTANEOUSLY MONITORING INTENSITY MODULATION AND FREQUENCY MODULATION

(75) Inventor: Fumihiko Ito, Tokyo (JP)

(73) Assignee: Nippon Telegraph and Telephone Corp., Tokyo (JP)

(*) Notice: Subject to any disclaimer, the term of this patent is extended or adjusted under 35 U.S.C. 154(b) by 259 days.

(21) Appl. No.: 10/679,906

(22) Filed: Oct. 6, 2003

(65) Prior Publication Data

US 2004/0071472 A1   Apr. 15, 2004

(30) Foreign Application Priority Data

Oct. 8, 2002   (JP)   ............ P2002-294705

(51) Int. Cl.
*G01B 9/02* (2006.01)
(52) U.S. Cl. ............ 356/477; 356/484; 398/102; 398/161; 398/178; 398/187
(58) Field of Classification Search ............ 356/477, 356/478, 479, 484; 398/79, 178, 149, 187, 398/189, 161, 102
See application file for complete search history.

(56) References Cited

U.S. PATENT DOCUMENTS 5,115,332 A * 5/1992 Naito et al. ............ 398/202
5,146,359 A * 9/1992 Okoshi et al. ............ 398/202

FOREIGN PATENT DOCUMENTS

| EP | 0 456 365 A2 | 11/1991 |
|---|---|---|
| JP | 02-137425 | 5/1990 |
| JP | 02-196533 | 8/1990 |
| JP | 04-229731 | 8/1992 |
| JP | 06-053906 | 2/1994 |
| JP | 07-015386 | 1/1995 |
| JP | 07-055579 | 3/1995 |
| JP | 09-162808 | 6/1997 |

* cited by examiner

*Primary Examiner*—Gregory Toatley
*Assistant Examiner*—Marissa J. Detschel
(74) *Attorney, Agent, or Firm*—Kilpatrick Stockton LLP

(57) ABSTRACT

The optical sampling system performs by detecting the interference effect which is a linear correlation between the signal lights and the optical pulses, so that both the signal lights and the optical pulses can have relatively low intensities, and the reception sensitivity is high. Also, the pulse width of the optical pulses and the amount of delay given to the optical pulses are the only factors that limit the time resolution, so that it is possible to provide the optical sampling system with excellent time resolution and power consumption properties, and it is possible for the optical sampling system to monitor not only the intensity of the signal lights but also the frequency modulation component as well.

12 Claims, 2 Drawing Sheets

OPTICAL SAMPLING SYSTEM FOR SIMULTANEOUSLY MONITORING INTENSITY MODULATION AND FREQUENCY MODULATION

BACKGROUND OF THE INVENTION

1. Field of the Invention

The present invention relates to an optical sampling method, system and program for monitoring repeatedly entered high speed signal lights, especially signal lights that are modulated at a speed that cannot be monitored by an ordinary photo-detector element or electric circuit.

2. Description of the Related Art

Conventional optical sampling systems have included a technique for monitoring low power and high speed repeating optical signals by monitoring linear correlation between signal lights and locally generated optical pulses. See Japanese Patent Application Laid Open No. 9-162808 (1997).

As shown in FIG. 2, in this conventional optical sampling system, the locally generated optical pulses from a sampling optical pulse generation unit 1 and the signal lights are injected into an optical hybrid 8, a plurality of output lights from this optical hybrid 8 are received by balanced optical receivers 5a and 5b, and output signals of these balanced optical receivers 5a and 5b are squared by square circuits 6a and 6b and then added together by an adder 7, so as to obtain an output proportional to an intensity of the signal lights at a time when the locally generated optical pulses and the signal lights overlap with each other. In this way, it is possible to realize an optical sampling operation with a time resolution equal to a pulse width of the locally generated optical pulses, without depending on a processing speed of electric circuits.

In general, the optical signals often receive intensity modulation, as well as frequency modulation. For example, when modulating using the ON/OFF control of the injection current of a semiconductor laser, the intensity is of course changed, but at the same time the frequency of the generated laser beam is also changed. Also, in the case where a modulated laser beam is transmitted through an optical fiber, the frequency of the optical signals after the transmission will be modulated due to the nonlinear optical effect of the optical fiber, which is called self phase modulation.

Thus, the conventional optical sampling system can monitor the intensity change of the signal lights, but cannot obtain any information regarding how the frequency has been changed.

BRIEF SUMMARY OF THE INVENTION

It is therefore an object of the present invention to provide an optical sampling method, system and program capable of monitoring the intensity modulation information, as well as the frequency modulation information of the signal lights simultaneously, while maintaining a high speed performance that can enable the monitoring of ultra high speed signal lights and a high sensitivity that can enable the monitoring of low power signal lights.

According to one aspect of the present invention there is provided an optical sampling method for monitoring repeatedly entered high speed signal lights, comprising the steps of: generating optical pulses with an optical pulse width shorter than an inverse of a frequency variation of the signal lights, which has a period slightly different from a repetition period of the signal lights, from an optical pulse generation unit; splitting each of the signal lights and the optical pulses into two parts by respective splitters; delaying a split part of either the signal lights or the optical pulses for a prescribed period of time by a delay unit; inputting one split part of the signal lights and one split part of the optical pulses into a first optical hybrid, while inputting the delayed split part of the signal lights or the optical pulses and the other split part of either the signal lights or the optical pulses whichever was not delayed into a second optical hybrid; receiving output lights from the first optical hybrid at first and second balanced optical receivers, and outputting first and second currents; receiving output lights from the second optical hybrid at third and fourth balanced optical receivers, and outputting third and fourth currents; and obtaining a frequency modulation component of the signal lights by calculation processing using values of the first to fourth currents by a calculation processing device.

According to another aspect of the present invention there is provided an optical sampling system for monitoring repeatedly entered high speed signal lights, comprising: an optical pulse generation unit configured to generate optical pulses with an optical pulse width shorter than an inverse of a frequency variation of the signal lights, which has a period slightly different from a repetition period of the signal lights; splitters configured to split each of the signal lights and the optical pulses into two parts; a delay unit configured to delay a split part of either the signal lights or the optical pulses for a prescribed period of time; a first optical hybrid configured to have one split part of the signal lights and one split part of the optical pulses inputted therein; a second optical hybrid configured to have the delayed split part of the signal lights or the optical pulses and the other split part of either the signal lights or the optical pulses whichever was not delayed inputted therein; first and second balanced optical receivers configured to receive output lights from the first optical hybrid, and output first and second currents; third and fourth balanced optical receivers configured to receive output lights from the second optical hybrid, and output third and fourth currents; and a calculation processing device configured to obtain a frequency modulation component of the signal lights by calculation processing using values of the first to fourth currents.

According to another aspect of the present invention there is provided a computer program product for causing a computer to function as a calculation processing device for obtaining a frequency modulation component of signal lights in an optical sampling system for monitoring repeatedly entered high speed signal lights, formed by: an optical pulse generation unit configured to generate optical pulses with an optical pulse width shorter than an inverse of a frequency variation of the signal lights, which has a period slightly different from a repetition period of the signal lights; splitters configured to split each of the signal lights and the optical pulses into two parts; a delay unit configured to delay a split part of either the signal lights or the optical pulses for a prescribed period of time; a first optical hybrid configured to have one split part of the signal lights and one split part of the optical pulses inputted therein; a second optical hybrid configured to have the delayed split part of the signal lights or the optical pulses and the other split part of either the signal lights or the optical pulses whichever was not delayed inputted therein; first and second balanced optical receivers configured to receive output lights from the first optical hybrid, and output first and second currents; third and fourth balanced optical receivers configured to receive output lights from the second optical hybrid, and output third and fourth currents; the computer program product comprising: a computer program code for causing the computer to obtain a frequency modulation component of the signal lights by calculation processing using values of the first to fourth currents.

Other features and advantages of the present invention will become apparent from the following description taken in conjunction with the accompanying drawings.

DETAILED DESCRIPTION OF THE INVENTION

Figure 1:
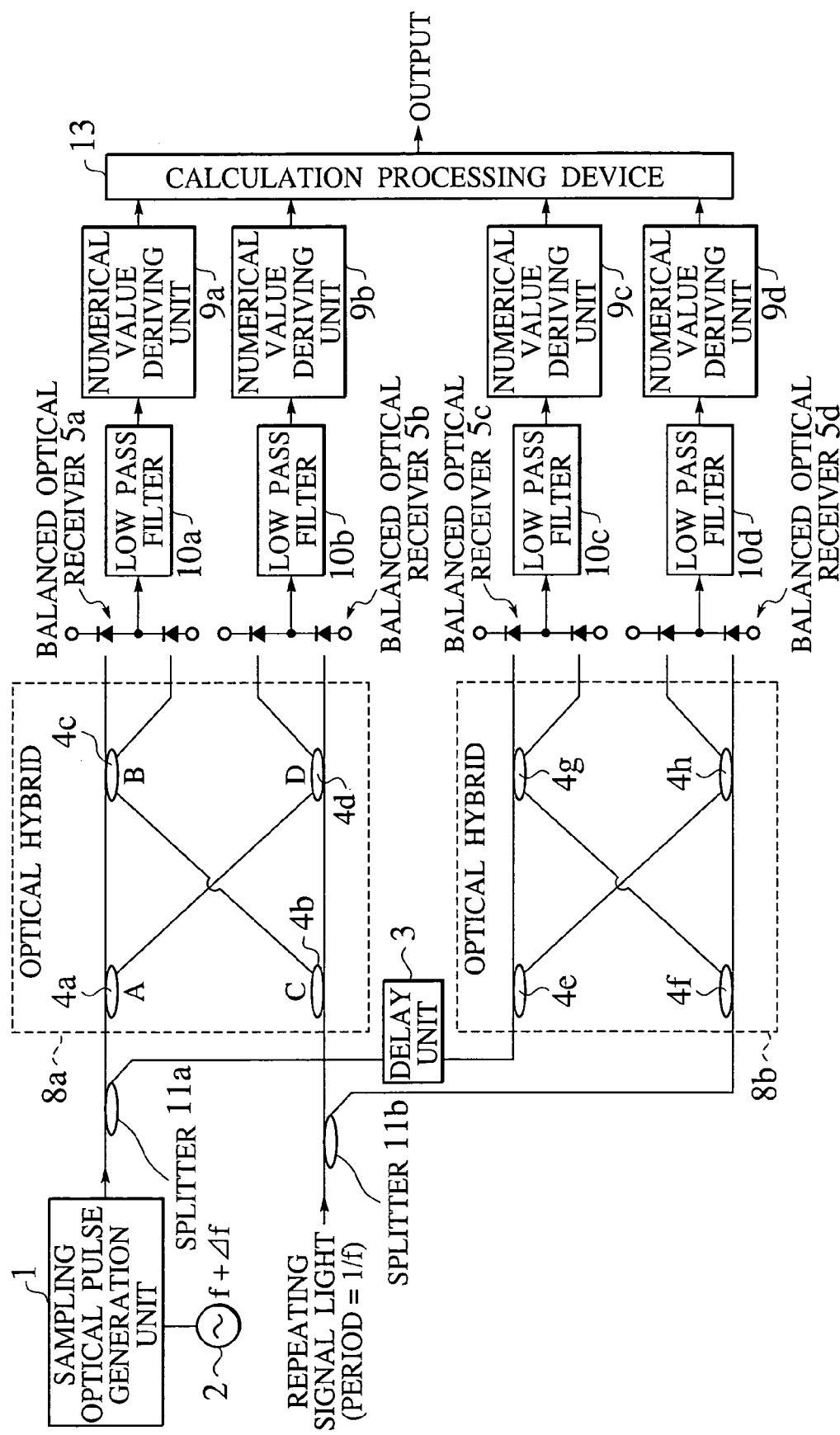
FIG. 1 is a block diagram showing an exemplary configuration of an optical sampling system according to one embodiment of the present invention.
Figure 2:
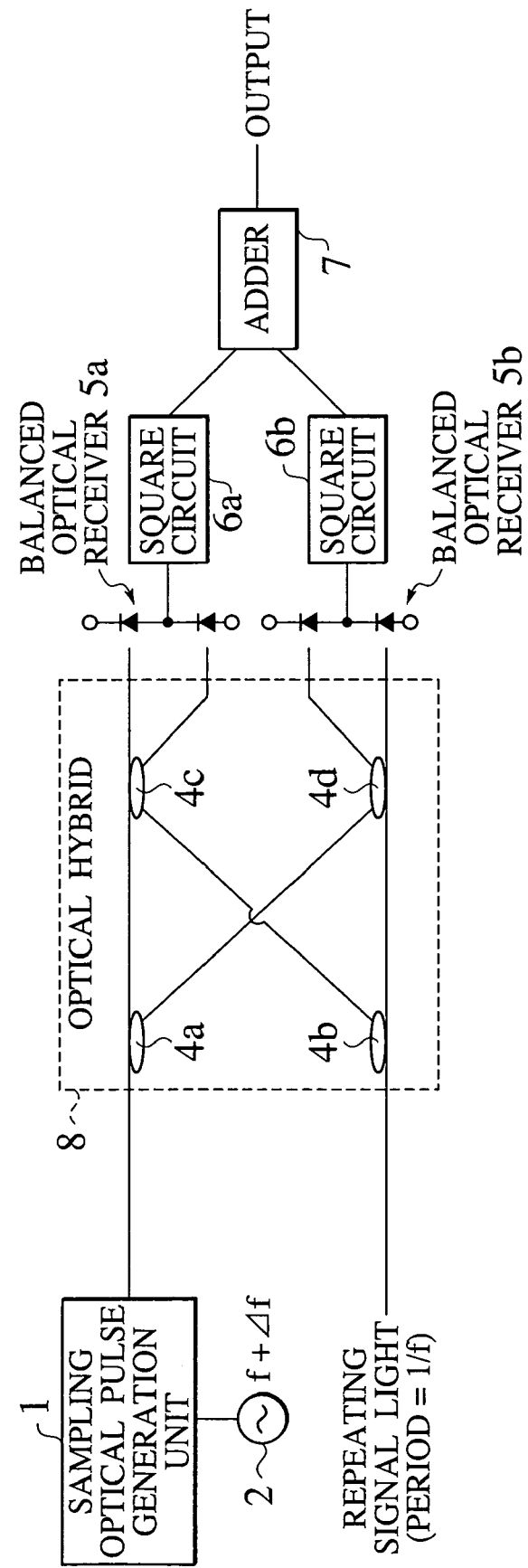
FIG. 2 is a block diagram showing an exemplary configuration of a conventional optical sampling system.

FIG. 1 shows an exemplary configuration of an optical sampling system according to one embodiment of the present invention. This optical sampling system is capable of obtaining not only the intensity but also the frequency modulation component of the signal lights that are repeatedly entered at a period of 1/f, and has a sine wave generator 2 for outputting sine wave electric signals of a period 1/(f+Δf) which is slightly different from the repetition period 1/f of the signal lights (Δf can be f/100 or f/1000, for example), and a sampling optical pulse generation unit 1 driven by the sine wave electric signals outputted from the sine wave generator 2, for generating sampling optical pulses with a period 1/(f+Δf) in which an offset Δf is added to the repetition period 1/f of the signal lights.

The sampling optical pulses that are locally generated optical pulses outputted from this sampling optical pulse generation unit 1 are split into two by a first splitter 11a, and one of the split beams is entered into an optical coupler 4a of a first optical 90° C. hybrid 8a while the other one of the split beams is entered into an optical coupler 4e of a second optical 90° hybrid 8b after being delayed for a prescribed period of time by a delay unit 3. Also, the signal lights that are repeatedly entered at a period of 1/f are split into two by a second splitter 11b, and one of the split beams is entered into an optical coupler 4b of the first optical 90° hybrid 8a while the other one of the split beams is entered into an optical coupler 4f of the second optical 90° hybrid 8b. The splitters 11a and 11b are formed by optical couplers or half mirrors.

Note that the delay unit 3 delays the sampling optical pulses from the sampling optical pulse generation unit 1 through the splitter 11a, but its purpose is to control a relative delay between the signal lights and the sampling optical pulses from the sampling optical pulse generation unit 1, so that it is also possible to provide the delay unit 3 at an output of the splitter 11b instead of providing the delay unit 3 at an output of the splitter 11a so as to delay the signal lights for a prescribed period of time.

The first and second optical 90° hybrids 8a and 8b (which will be referred to simply as optical hybrids hereafter) are formed by optical couplers 4a, 4b, 4c and 4d, and optical couplers 4e, 4f, 4g and 4h, respectively, and set up such that an optical path length difference between an optical path length A and an optical path length C becomes larger or smaller than an optical path length difference between an optical path length B and an optical path length D by λ/4 (where λ is a wavelength of light). It is well known that the optical hybrid 8 can be realized by a free space optical system using half mirrors or an integrated optical circuit, for example.

Four output lights from the first optical hybrid 8a are received by first and second balanced optical receivers 5a and 5b. Waveforms of two output currents from these first and second balanced optical receivers 5a and 5b are equalized at first and second low pass filters 10a and 10b which are set to have a blocking frequency approximately equal to an inverse of a dividing interval T, converted into numerical values by first and second numerical value deriving units 9a and 9b, and entered into a calculation processing device 13.

Also, four output lights from the second optical hybrid 8b are received by third and fourth balanced optical receivers 5c and 5d. Waveforms of two output currents from these third and fourth balanced optical receivers 5c and 5d are equalized at third and fourth low pass filters 10c and 10d which are similarly set to have a blocking frequency approximately equal to an inverse of a dividing interval T, converted into numerical values by third and fourth numerical value deriving units 9c and 9d, and entered into the calculation processing device 13.

The calculation processing device $I_3$ obtains a frequency modulation of the signal lights by carrying out calculation processing to be described below, with respect to four numerical value signals entered as described above, i.e., four current values produced by the first to fourth balanced optical receivers 5a to 5d.

Next, the operation of the optical sampling system of this embodiment having the above described configuration will be described. The sampling optical pulses which are locally generated optical pulses outputted from the sampling optical pulse generation unit 1 are required to satisfy the following conditions.

(Condition #1) An intensity of the signal lights hardly changes within a time period of a pulse width of the locally generated optical pulses.

(Condition #2) A frequency of the signal lights hardly changes within a time period of a pulse width of the locally generated optical pulses.

(Condition #3) A central frequency of the optical pulses nearly coincides with a central frequency of the signal lights.

The above described conditions #1 and #2 imply that there is a need to provide the optical pulses which are shorter than the time resolution required for the optical sampling system.

In the following paragraphs, the fact that the amplitude of signals can be detected correctly by the optical sampling system of the present invention when the above described conditions are satisfied will be described.

First, the waveforms of the signal light and the sampling optical pulse can be expressed by the following equations (1) and (2).

$$Sig(t)=A(t)\exp\{j\,[\omega_0+\omega_M(t)]t\}\text{(signal light)} \tag{1}$$

$$Sam(t)=\delta(t-\tau)\exp(j\omega_0 t+\phi)\text{(sampling optical pulse)} \tag{2}$$

Here, A(t) is an amplitude of the signal light, $j^2=-1$, $\omega_0$ is a central frequency of the signal light, $\omega_M(\tau)$ is a frequency modulation component of the signal light, $\delta(t-\tau)$ is a central position of the optical pulse. Also, $\phi$ is a relative phase difference between the sampling optical pulse and the signal light, which changes randomly when the signal light and the sampling optical pulse are generated from separate lasers.

Because of the condition #3, both of the central frequencies of the signal light and the sampling optical pulse can be set to $\omega_0$. At this point, the currents $I_1(\tau)$ and $I_2(\tau)$ that flow through the first and second balanced optical receivers 5a and 5b respectively can be expressed by the following equations (3) and (4).

$$I_1(\tau) = Avr[Sig(t)Sam^*(t)\exp\{j(\omega_M(t)t + \phi)\} + c.c.] \quad (3)$$
$$= Avr[A(t)\delta^*(t-\tau)\exp\{j(\omega_M(t)t + \phi)\} + c.c.] \text{(balanced optical receiver } 5a)$$

$$I_2(\tau) = Avr[Sig(t)Sam^*(t)\exp\{j(\pi/2 + \omega_M(t)t + \phi)\} + c.c.] \quad (4)$$
$$= Avr[A(t)\delta^*(t-\tau)\exp\{j(\pi/2 + \omega_M(t)t + \phi)\} + c.c.] \text{(balanced optical receiver } 5b)$$

Here, Avr indicates an average over an integration time by the low pass filter 10 around a time $\tau$. Also, $\delta(t)$ is a waveform of the locally generated pulse, which has finite values only around a time $\tau$ and which is zero elsewhere.

Also, because of the conditions #1 and #2, the intensity $A(t)$ and the frequency $\phi_M(t)$ of the signal light do not change during the pulse width of $\delta(t)$ and their values are $A(\tau)$ and $\phi(\tau)$, so that the currents $I_1(\tau)$ and $I_2(\tau)$ that flow through the first and second balanced optical receivers 5a and 5b respectively can be expressed by the following equations (5) and (6).

$$I_1(\tau) = \delta(0)A(\tau)\exp\{j(\omega_M(\tau)\tau + \phi)\} + c.c. \quad (5)$$
$$= \delta(0)A(\tau)\cos(\omega_M(\tau)\tau + \phi) \text{(balanced optical receiver } 5a)$$

$$I_2(\tau) = A(\tau)\delta^*(\tau)\exp\{j(\omega_M(\tau)\tau + \phi + \pi/2)\} + c.c. \quad (6)$$
$$= \delta(0)A(\tau)\sin(\omega_M(\tau)\tau + \phi) \text{(balanced optical receiver } 5b)$$

Next, the currents $I_3(\tau)$ and $I_4(\tau)$ that flow through the third and fourth balanced optical receivers 5c and 5d respectively will be considered. The currents $I_3(\tau)$ and $I_4(\tau)$ that flow through the third and fourth balanced optical receivers 5c and 5d are basically the same as the currents $I_2(\tau)$ and $I_3(\tau)$ that flow through the first and second balanced optical receivers 5a and 5b, except that the delay unit 3 is inserted on a path of the sampling optical pulses which are the locally generated optical pulses from the sampling optical pulse generation unit 1.

When the path length difference due to the delay unit 3 is L, the signal lights and the locally generated optical pulses will enter the second optical hybrid 8b with a time difference T given by the following equation (7).

$$T = L/c \text{ (where } c \text{ is the speed of light)} \quad (7)$$

There is a need to measure this path length difference L in advance, and it is necessary to maintain the wavelength level of the lights stably without any variation during the measurement.

In order to raise the time resolution of the optical sampling system of this embodiment to the maximum level, the time difference $T=L/c$ should be set to the same level or within several times of the pulse width of the locally generated optical pulses. Namely, as will be described below, there is a need for the frequency of the signal lights to remain unchanged during the time difference T in order for the optical sampling system of this embodiment to operate properly.

The currents $I_3(\tau)$ and $I_4(\tau)$ that flow through the third and fourth balanced optical receivers 5c and 5d respectively can be expressed by the following equations (8) and (9).

$$I_3(\tau) = Avr[Sig(t)Sam^*(t-T)\exp\{j(\omega_M(t)t + \phi)\} + c.c.] \quad (8)$$
$$= Avr[A(t)\delta^*(t-(\tau+T))\exp\{j(\omega_M(t)t + \phi)\} + c.c.] \text{(balanced optional receiver } 5c)$$

$$I_4(\tau) = Avr[Sig(t)Sam^*(t-T)\exp\{j(\pi/2 + \omega_M(t)t + \phi)\} + c.c.] \quad (9)$$
$$= Avr[A(t)\delta^*(t-(\tau+T))\exp\{j(\pi/2 + \omega_M(t)t + \phi)\} + c.c.] \text{(balanced optical receicer } 5d)$$

Then, by a calculation similar to those of the currents $I_1(\tau)$ and $I_2(\tau)$ described above, the currents $I_3(\tau)$ and $I_4(\tau)$ can be expressed by the following equations (10) and (11).

$$I_3(\tau) = A(\tau+T)\delta^*(0)\exp\{j(\omega_M(\tau+T)(\tau+T) + \phi)\} + c.c. \quad (10)$$
$$= \delta(0)A(\tau+T)\cos(\omega_M(\tau+T)(\tau+T) + \phi) \text{(balanced optical receiver } 5c)$$

$$I_4(\tau) = A(\tau)\delta^*(0)\exp\{j(\omega_M(\tau+T)(\tau+T) + \phi + \pi/2)\} + c.c. \quad (11)$$
$$= \delta^*(0)A(\tau+T)\sin(\omega_M(\tau+T)(\tau+T) + \phi) \text{(balanced optical receiver } 5d)$$

As described above, in order to raise the time resolution of the optical sampling system of this embodiment to the maximum level, the time difference $T=L/c$ is set to the same level or within several times of the pulse width of the locally generated optical pulses, and under this condition, the frequency ($\omega_M$) of the signal lights does not change during the time difference T, so that the currents $I_3(\tau)$ and $I_4(\tau)$ can be expressed by the following equations (12) and (13).

$$I_3(\tau) = \delta^*(0)A(\tau+T)\sin(\omega_M(\tau)(\tau+T)+\phi)(\text{balanced optical receiver } 5c) \quad (12)$$

$$I_4 = (\tau)\delta^*(0)A(\tau+T)\sin(\omega_M(\tau)(\tau+T)+\phi)(\text{balanced optical receiver } 5d) \quad (13)$$

The currents $I_1(\tau)$, $I_2(\tau)$, $I_3(\tau)$ and $I_4(\tau)$ calculated as above are outputted from the first to fourth balanced optical receivers 5a, 5b, 5c and 5d, respectively, low pass filtered by the first to fourth low pass filters 10a to 10d, converted into numerical values by the first to fourth numerical value deriving units 9a to 9d, and supplied to the calculation processing device 13.

The calculation processing device 13 carries out the calculation for obtaining the frequency $\omega_M(\tau)$ at a time $\tau$ of the signal lights from the equations (5), (6), (12) and (13) as follows.

First, the equation (6) is divided by the equation (5) and the equation (13) is divided by the equation (12) to obtain the following equations (14) and (15).

$$I_2(\tau)/I_1(\tau)=\tan(\omega_M(\tau)\tau+\phi) \quad (14)$$

$$I_4(\tau)/I_3(\tau)=\tan(\omega_M(\tau)\tau+T)\phi) \quad (15)$$

Consequently, the frequency $\omega_M(\tau)$ can be calculated by the following equation (16).

$$\omega_M=(\tau)\{\arctan(I_4(\tau)/I_3(\tau))-\arctan(I_2(\tau)/I_1(\tau))\}/T \quad (16)$$

By carrying out the calculation shown in the equation (16) at the calculation processing device 13 with respect to the output currents $I_1(\tau)$, $I_2(\tau)$, $I_3(\tau)$ and $I_4(\tau)$ of the balanced optical receivers 5a to 5d monitored as described above, it is possible to obtain the frequency modulation at a time $\tau$ of the signal lights.

Note that, from the output currents of either pair of the balanced optical receivers 5, such as the currents $I_1(\tau)$ and $I_2(\tau)$, for example, it is of course also possible to obtain the intensity modulation component A(t) by carrying out the calculation of the following equation (17).

$$(I_1(\tau))^2 \alpha A^2(\tau) \quad (17)$$

As described above, the optical sampling system of this embodiment performs optical sampling by detecting the interference effect which is a linear correlation between the signal lights and the optical pulses, so that it suffices for both the signal lights and the optical pulses can have relatively low intensities, and the reception sensitivity is high. Also, the pulse width of the optical pulses and the amount of delay given to the optical pulses are the only factors that limit the time resolution, so that it is possible to provide the optical sampling system with excellent time resolution and power consumption properties just as in the prior art, and while maintaining these properties, it is possible for the optical sampling system of this embodiment to monitor not only the intensity of the signal lights but also the frequency modulation component as well. As a result, it becomes possible to realize the optical sampling with a wider range of applications such as the monitoring of frequency modulated or phase modulated lights that are used in coherent optical transmission, for example, and the monitoring of the frequency modulation due to the self phase modulation at the time of the propagation inside the optical fiber.

Note that the calculation processing at the calculation processing device 13 of the optical sampling system of the above described embodiment should preferably be realized by a program.

As described above, according to the present invention, the optical pulses which have a period that is slightly different from the repetition period of the signal lights and a pulse width that is shorter than an inverse of a frequency variation of the signal lights are generated, the signal lights and the optical pulses are split, the one split part of optical pulses and signal lights are entered into the first optical hybrid, the other split part of the signal lights and the optical pulses one of which is delayed after the splitting while the other one is not delayed are entered into the second optical hybrid, the output lights from the first and second optical hybrids are received by the first to fourth balanced optical receivers which output the first to fourth currents, and the frequency modulation component of the signal lights is obtained by the calculation processing of these first to fourth current values, so that it is possible to realize the optical sampling by detecting the interference effect which is a linear correlation between the signal lights and the optical pulses, it suffices for both the signal lights and the optical pulses to have relatively low intensities, the reception sensitivity is high, the time resolution and power consumption properties are excellent, and it is possible to monitor not only the intensity of the signal lights but also the frequency modulation component as well.

It is to be noted that the calculation processing device of the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the calculation processing device of the above described embodiments can be conveniently implemented in a form of a software package. Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention.

Accordingly, all such modifications and variations are intended to be included within the scope of the appended claims.

What is claimed is:

1. An optical sampling method for monitoring repeatedly entered high speed signal lights, comprising the steps of:
generating optical pulses with an optical pulse width shorter than an inverse of a frequency variation of the signal lights, which has a period slightly different from a repetition period of the signal lights, from an optical pulse generation unit;
splitting each of the signal lights and the optical pulses into two parts by respective splitters;
delaying a split part of either the signal lights or the optical pulses for a prescribed period of time by a delay unit;
inputting one split part of the signal lights and one split part of the optical pulses into a first optical hybrid, while inputting the delayed split part of the signal lights or the optical pulses and the other split part of either the signal lights or the optical pulses whichever was not delayed into a second optical hybrid;
receiving output lights from the first optical hybrid at first and second balanced optical receivers, and outputting first and second currents;
receiving output lights from the second optical hybrid at third and fourth balanced optical receivers, and outputting third and fourth currents; and
obtaining a frequency modulation component of the signal lights by calculation processing using values of the first to fourth currents by a calculation processing device.

2. The optical sampling method of claim 1, wherein at the obtaining step, the calculation processing device carries out the calculation processing such that waveforms of the first to fourth currents are equalized by being filtered through first to fourth low pass filters, first to fourth output currents of the first to fourth low pass filters are converted into numerical values by a numerical value deriving units, and the calculation processing is carried out by using the values obtained by the numerical value deriving units.

3. The optical sampling method of claim 1, wherein when the first to fourth output currents from the first to fourth balanced optical receivers are $I_1(\tau)$, $I_2(\tau)$, $I_3(\tau)$ and $I_4(\tau)$, the calculation processing device carries out the calculation processing in which the second output current $I_2(\tau)$ is divided by the first output current $I_1(\tau)$, the fourth output current $I_4(\tau)$ is divided by the third output current $I_3(\tau)$, and the frequency modulation component of the signal lights is calculated according to two divided values, under a first condition that an intensity of the signal lights hardly changes during a time period of the optical pulse width of the optical pulses, a second condition that a frequency of the signal lights hardly changes during the time period of the optical pulse width of the optical pulses, and a third condition that a central frequency of the optical pulses nearly coincides with a central frequency of the signal lights.

4. The optical sampling method of claim 3, wherein at the obtaining step, the calculation processing device calculates the frequency modulation component $\omega_M(\tau)$ at a time $\tau$ by:

$$\omega_M(\tau) = \{\arctan(I_4(\tau)/I_3(\tau)) - \arctan(I_2(\tau)/I_1(\tau))\}/T$$

where T is a time difference given by the delay unit.

5. An optical sampling system for monitoring repeatedly entered high speed signal lights, comprising:
an optical pulse generation unit configured to generate optical pulses with an optical pulse width shorter than an inverse of a frequency variation of the signal lights, which has a period slightly different from a repetition period of the signal lights;
splitters configured to split each of the signal lights and the optical pulses into two parts;
a delay unit configured to delay a split part of either the signal lights or the optical pulses for a prescribed period of time;
a first optical hybrid configured to have one split part of the signal lights and one split part of the optical pulses inputted therein;
a second optical hybrid configured to have the delayed split part of the signal lights or the optical pulses and the other split part of either the signal lights or the optical pulses whichever was not delayed inputted therein;
first and second balanced optical receivers configured to receive output lights from the first optical hybrid, and output first and second currents;
third and fourth balanced optical receivers configured to receive output lights from the second optical hybrid, and output third and fourth currents; and
a calculation processing device configured to obtain a frequency modulation component of the signal lights by calculation processing using values of the first to fourth currents.

6. The optical sampling system of claim 5, wherein the calculation processing device carries out the calculation processing such that waveforms of the first to fourth currents are equalized by being filtered through first to fourth low pass filters, first to fourth output currents of the first to fourth low pass filters are converted into numerical values by a numerical value deriving units, and the calculation processing is carried out by using first to fourth current values obtained by the numerical value deriving units.

7. The optical sampling system of claim 5, wherein when the first to fourth output currents from the first to fourth balanced optical receivers are $I_1(\tau)$, $I_2(\tau)$, $I_3(\tau)$ and $I_4(\tau)$, the calculation processing device carries out the calculation processing in which the second output current $I_2(\tau)$ is divided by the first output current $I_1(\tau)$, the fourth output current $I_4(\tau)$ is divided by the third output current $I_3(\tau)$, and the frequency modulation component of the signal lights is calculated according to two divided values, under a first condition that an intensity of the signal lights hardly changes during a time period of the optical pulse width of the optical pulses, a second condition that a frequency of the signal lights hardly changes during the time period of the optical pulse width of the optical pulses, and a third condition that a central frequency of the optical pulses nearly coincides with a central frequency of the signal lights.

8. The optical sampling system of claim 7, wherein the calculation processing device calculates the frequency modulation component $\omega_M(\tau)$ at a time $\tau$ by:

$$\omega_M(\tau) = \{\arctan(I_4(\tau)/I_3(\tau)) - \arctan(I_2(\tau)/I_1(\tau))\}/T$$

where T is a time difference given by the delay unit.

9. A computer program product for causing a computer to function as a calculation processing device for obtaining a frequency modulation component of signal lights in an optical sampling system for monitoring repeatedly entered high speed signal lights, formed by: an optical pulse generation unit configured to generate optical pulses with an optical pulse width shorter than an inverse of a frequency variation of the signal lights, which has a period slightly different from a repetition period of the signal lights; splitters configured to split each of the signal lights and the optical pulses into two parts; a delay unit configured to delay a split part of either the signal lights or the optical pulses for a prescribed period of time; a first optical hybrid configured to have one split part of the signal lights and one split part of the optical pulses inputted therein; a second optical hybrid configured to have the delayed split part of the signal lights or the optical pulses and the other split part of either the signal lights or the optical pulses whichever was not delayed inputted therein; first and second balanced optical receivers configured to receive output lights from the first optical hybrid, and output first and second currents; third and fourth balanced optical receivers configured to receive output lights from the second optical hybrid, and output this third and fourth currents; the computer program product comprising:

a computer program code for causing the computer to obtain a frequency modulation component of the signal lights by calculation processing using values of the first to fourth currents.

10. The computer program product of claim 9, wherein the computer program code causes the computer to carry out the calculation processing such that waveforms of the first to fourth currents are equalized by being filtered through first to fourth low pass filters, first to fourth output currents of the first to fourth low pass filters are converted into numerical values by a numerical value deriving units, and the calculation processing is carried out by using the values obtained by the numerical value deriving units.

11. The computer program product of claim 9, wherein when the first to fourth output currents from the first to fourth balanced optical receivers are $I_1(\tau)$, $I_2(\tau)$, $I_3(\tau)$ and $I_4(\tau)$, the computer program code causes the computer to carry out the calculation processing in which the second output current $I_2(\tau)$ is divided by the first output current $I_1(\tau)$, the fourth output current $I_4(\tau)$ is divided by the third output current $I_3(\tau)$, and the frequency modulation component of the signal lights is calculated according to two divided values, under a first condition that an intensity of the signal lights hardly changes during a time period of the optical pulse width of the optical pulses, a second condition that a frequency of the signal lights hardly changes during the time period of the optical pulse width of the optical pulses, and a third condition that a central frequency of the optical pulses nearly coincides with a central frequency of the signal lights.

12. The computer program product of claim 11, wherein the computer program code causes the computer to calculate the frequency modulation component $\omega_M(\tau)$ at a time $\tau$ by:

$$\omega_M(\tau) = \{\arctan(I_4(\tau)/I_3(\tau)) - \arctan(I_2(\tau)/I_1(\tau))\}/T$$

where T is a time difference given by the delay unit.

* * * * *